(12) United States Patent
Yashima et al.

(10) Patent No.: US 11,958,145 B2
(45) Date of Patent: Apr. 16, 2024

(54) WELDING DEVICE, AND WELDING METHOD EMPLOYING WELDING DEVICE

(71) Applicants: Kobe Steel, Ltd., Kobe (JP); KOBELCO ROBOTIX Co., Ltd., Fujisawa (JP)

(72) Inventors: Takashi Yashima, Fujisawa (JP); Masahiro Yokota, Fujisawa (JP); Shun Izutani, Fujisawa (JP); Hirofumi Kawasaki, Nagasaki (JP); Shinobu Toda, Nagasaki (JP)

(73) Assignees: Kobe Steel, Ltd., Kobe (JP); KOBELCO ROBOTiX Co., Ltd., Fujisawa (JP)

( * ) Notice: Subject to any disclaimer, the term of this patent is extended or adjusted under 35 U.S.C. 154(b) by 858 days.

(21) Appl. No.: 16/981,932

(22) PCT Filed: Mar. 13, 2019

(86) PCT No.: PCT/JP2019/010161
§ 371 (c)(1),
(2) Date: Sep. 17, 2020

(87) PCT Pub. No.: WO2019/188272
PCT Pub. Date: Oct. 3, 2019

(65) Prior Publication Data
US 2021/0016386 A1      Jan. 21, 2021

(30) Foreign Application Priority Data

Mar. 30, 2018   (JP) ................................ 2018-069163

(51) Int. Cl.
*B23K 9/173*      (2006.01)
*B23K 9/09*       (2006.01)
(Continued)

(52) U.S. Cl.
CPC .............. *B23K 9/173* (2013.01); *B23K 9/092* (2013.01); *B23K 9/0953* (2013.01); *B23K 9/125* (2013.01);
(Continued)

(58) Field of Classification Search
CPC ...... B23K 9/173; B23K 9/092; B23K 9/0953; B23K 9/125; B23K 9/164; B23K 9/293; B23K 37/0229
See application file for complete search history.

(56) References Cited

U.S. PATENT DOCUMENTS

2007/0210048 A1*   9/2007  Koshiishi ............... B23K 9/095
                                                         219/130.51
2009/0261085 A1*  10/2009  Suzuki ................. B23K 35/362
                                                         219/145.22
(Continued)

FOREIGN PATENT DOCUMENTS

JP       2-11276 A     1/1990
JP    11-320100 A    11/1999
(Continued)

OTHER PUBLICATIONS

International Search Report dated May 21, 2019 in PCT/JP2019/010161 filed on Mar. 13, 2019, 2 pages.
(Continued)

*Primary Examiner* — Nathaniel E Wiehe
*Assistant Examiner* — Keith Brian Assante
(74) *Attorney, Agent, or Firm* — Oblon, McClelland, Maier & Neustadt, L.L.P.

(57) ABSTRACT

A welding device for gas shielded arc welding includes: a portable welding robot mounted with a welding torch including a nozzle that guides jetting of shielding gas and a contact tip that performs energization on a consumable electrode; a feeding device that supplies the consumable (Continued)

electrode to the welding torch; a welding power source that supplies electric power to the consumable electrode via the contact tip; a gas supply source that supplies the shielding gas to be jetted from a nozzle end; and a control device that controls the portable welding robot. When the welding torch is seen from a side of jetting of the shielding gas, the contact tip is placed in an inside of an opening of the nozzle, the nozzle and the contact tip have a relatively movable structure, and an inner diameter of the nozzle end is within a range of 10-20 mm.

3 Claims, 5 Drawing Sheets

(51) Int. Cl.
  *B23K 9/095* (2006.01)
  *B23K 9/12* (2006.01)
  *B23K 9/16* (2006.01)
  *B23K 9/29* (2006.01)
  *B23K 37/02* (2006.01)

(52) U.S. Cl.
  CPC .............. *B23K 9/164* (2013.01); *B23K 9/293* (2013.01); *B23K 37/0229* (2013.01)

(56) References Cited

U.S. PATENT DOCUMENTS

| | | | |
|---|---|---|---|
| 2010/0133240 A1* | 6/2010 | Takahashi | B23K 9/295 |
| | | | 219/136 |
| 2014/0014638 A1* | 1/2014 | Artelsmair | B23K 9/126 |
| | | | 219/130.01 |
| 2017/0209950 A1* | 7/2017 | Nishimura | B23K 9/0203 |
| 2018/0015561 A1* | 1/2018 | Kawabe | B23K 9/32 |
| 2018/0345402 A1* | 12/2018 | Wall | B23K 9/295 |

FOREIGN PATENT DOCUMENTS

| | | |
|---|---|---|
| JP | 2001-287032 A | 10/2001 |
| JP | 2007-167879 A | 7/2007 |
| JP | 2007-237270 A | 9/2007 |
| JP | 2011-224617 A | 11/2011 |

OTHER PUBLICATIONS

International Preliminary Report on Patentability and Written Opinion dated Oct. 6, 2020 in PCT/JP2019/010161 (submitting English translation only), 8 pages.

* cited by examiner

WELDING DEVICE, AND WELDING METHOD EMPLOYING WELDING DEVICE

TECHNICAL FIELD

The present invention relates to a welding device including a portable welding robot, and a welding method employing the welding device.

BACKGROUND ART

In the manufacturing of welded structures in shipbuilding, steel frames, bridges, etc., welding working in factories is performed in a situation where automation is advanced and a multi-axis welding robot is frequently used. Among them, in particular, a lightweight portable small sized robot that a worker can carry by oneself is widely used. In such a portable small sized robot, in general, longtime welding is performed automatically, with importance attached to working efficiency. Hence, spatter drops generated adhere to a nozzle, and interfere with the jetting of gas; therefore, there is a problem that the instability of the arc is encouraged and the occurrence of spatter drops and the occurrence of welding defects such as blowholes are conspicuous.

To solve such a problem, a portable welding robot including a nozzle cleaner serving also as a wire processor composed of an uneven plate that removes spatter drops and a file that removes an insulating oxide covering is proposed (for example, see Patent Literature 1).

CITATION LIST

Patent Literature

Patent Literature 1: JP 2001-287032 A

SUMMARY OF INVENTION

Technical Problem

In the portable welding robot described in Patent Literature 1, spatter drops adhering to the nozzle are removed by the nozzle cleaner provided in the portable welding robot. However, when performing the removal, it is necessary to stop welding once, and there is a problem that longtime continuous welding is difficult and working efficiency is reduced.

The present invention has been made in view of the problem mentioned above, and an object of the present invention is to provide a welding device and a welding method employing the welding device that enable longtime continuous welding to improve working efficiency.

Solution to Problem

In consideration of such object, a welding device according to an aspect of the present invention is the welding device for gas shielded arc welding, including:
 a portable welding robot mounted with a welding torch including a nozzle that guides jetting of shielding gas and a contact tip that performs energization on a consumable electrode;
 a feeding device that supplies the consumable electrode to the welding torch;
 a welding power source that supplies electric power to the consumable electrode via the contact tip;
 a gas supply source that supplies the shielding gas to be jetted from an end of the nozzle; and
 a control device that controls the portable welding robot, in which
 when the welding torch is seen from a side of jetting of the shielding gas,
 the contact tip is placed in an inside of an opening of the nozzle,
 the nozzle and the contact tip have a relatively movable structure, and
 an inner diameter of the end of the nozzle is within a range of not less than 10 mm and not more than 20 mm.

A welding method according to an aspect of the present invention is a gas shielded arc welding method using a welding device, in which
 the welding device is a device including
 a portable welding robot mounted with a welding torch including a nozzle that guides jetting of shielding gas and a contact tip that performs energization on a consumable electrode,
 a feeding device that supplies the consumable electrode to the welding torch,
 a welding power source that supplies electric power to the consumable electrode via the contact tip,
 a gas supply source that supplies the shielding gas to be jetted from an end of the nozzle, and
 a control device that controls the portable welding robot, in which
 when the welding torch is seen from a side of jetting of the shielding gas,
 the contact tip is placed in an inside of an opening of the nozzle,
 the nozzle and the contact tip have a relatively movable structure, and
 an inner diameter of the end of the nozzle is within a range of not less than 10 mm and not more than 20 mm,
 a flow rate of the shielding gas is within a range of not less than 15 L/min and not more than 50 L/min, and
 a flow velocity of the shielding gas is within a range of not less than 1 m/sec and not more than 10 m/sec.

In addition, a multilayer welding method according to an aspect of the present invention is a multilayer welding method that is a gas shielded arc welding method for multilayer welding using a welding device, in which
 the welding device is a device including
 a portable welding robot mounted with a welding torch including a nozzle that guides jetting of shielding gas and a contact tip that performs energization on a consumable electrode,
 a feeding device that supplies the consumable electrode to the welding torch,
 a welding power source that supplies electric power to the consumable electrode via the contact tip,
 a gas supply source that supplies the shielding gas to be jetted from an end of the nozzle, and
 a control device that controls the portable welding robot, in which,
 when the welding torch is seen from a side of jetting of the shielding gas,
 the contact tip is placed in an inside of an opening of the nozzle,
 the nozzle and the contact tip have a relatively movable structure, and
 an inner diameter of the end of the nozzle is within a range of not less than 10 mm and not more than 20 mm,
 a flow rate of the shielding gas is within a range of not less than 15 L/min and not more than 50 L/min, a flow velocity of the shielding gas is within a range of not less than 1 m/sec and not more than 10 m/sec, and in a case of the multilayer welding, (1) only a first layer,
(2) the first layer to a second layer, or
(3) the first layer to a third layer are welded using, as a welding current supplied from the welding power source, a direct current of a constant voltage not using a pulse waveform, and remaining layers are welded using, as the welding current, a welding current having a pulse waveform in which a combination of a first pulse and a second pulse is set as one period, the first pulse has a higher peak current value than the second pulse, and the second pulse has a longer peak span than the first pulse.

Advantageous Effects of Invention

According to the aspects mentioned above, a welding device and a welding method employing the welding device that enable longtime continuous welding to improve working efficiency can be provided.

DESCRIPTION OF EMBODIMENTS

Figure 1:
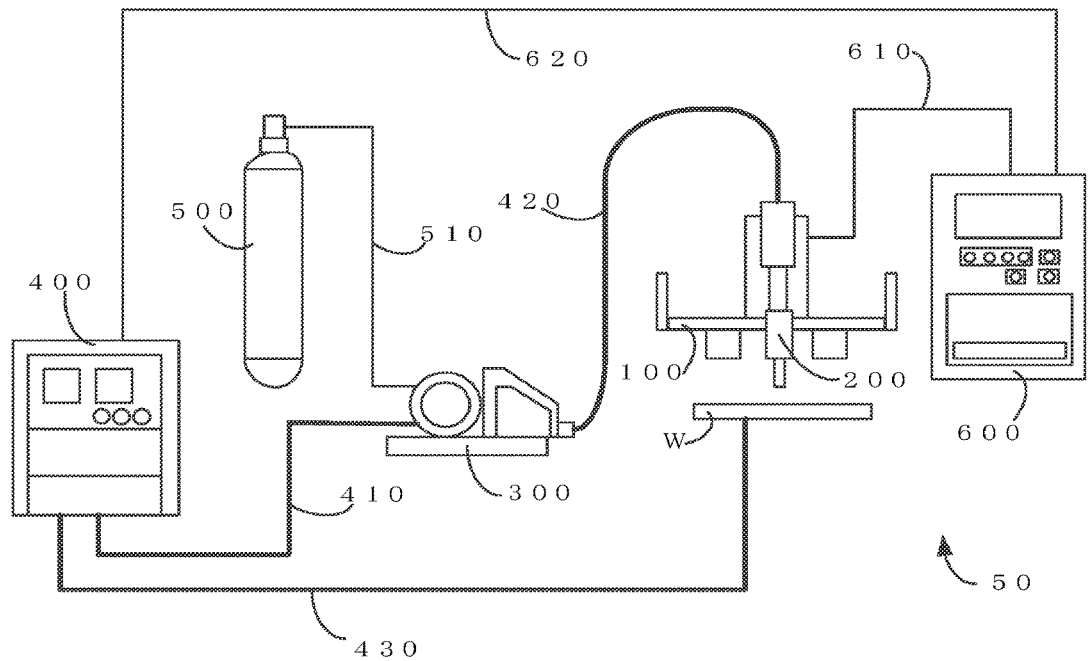
FIG. 1 is a schematic diagram showing a configuration of a welding device according to an embodiment of the present invention.

Hereinbelow, embodiments for implementing the present invention are described with reference to the drawings. The embodiments described below are those for embodying the technical idea of the present invention, and the present invention is not limited to the following embodiments unless otherwise specified.

In the drawings, members having the same function may be marked with the same reference sign. In view of description of the gist or ease of understanding, embodiments may be shown separately for the sake of convenience; however, partial replacement or combination of configurations shown in different embodiments is possible. In an embodiment described in a later part, a description regarding matters in common with an embodiment described in an earlier part is omitted, and only different points are described. In particular, similar actions and effects based on similar configurations are not mentioned one by one for embodiments. The sizes, positional relationships, etc. of members shown by the drawings may be expressed exaggeratedly in order to make the description clearer.

(Welding Device According to One Embodiment of Present Invention)

First, a welding device according to an embodiment of the present invention is described with reference to FIG. 1. FIG. 1 is a schematic diagram showing a configuration of a welding device according to an embodiment of the present invention.

As shown in FIG. 1, a welding device 50 according to the present embodiment is a welding device for performing gas shielded arc welding. The welding device 50 includes a portable welding robot 100 equipped with a welding torch 200. The welding device 50 further includes a feeding device 300 that supplies a consumable electrode (hereinafter, referred to as a "welding wire") to the welding torch 200, a welding power source 400 that supplies electric power to the welding wire, a gas supply source 500 that supplies shielding gas to be jetted from an end of the welding torch 200, and a control device 600 that controls the portable welding robot 100.

The portable welding robot 100 is a welding robot that has a reduced weight and that can be carried easily by an operator by oneself. The welding torch 200 mounted on the portable welding robot 100 includes a contact tip 220 that is an energization mechanism that allows the welding wire to be energized and a nozzle 210 that is a mechanism that jets shielding gas.

A positive electrode and a negative electrode of the welding power source 400, and the contact tip 220 and a workpiece W are electrically connected, respectively. A welding wire supplied to the welding torch 200 by the feeding device 300 passes through the interior of the welding torch 200, and comes into contact with the contact tip 220 placed in an end portion. Thereby, electric power is supplied from the welding power source 400 to the welding wire via the contact tip 220 at the end of the welding torch 200. Thus, an arc is generated from the end of the welding wire, and the workpiece W that is a welding object can be welded by the heat of the arc. During welding, shielding gas is jetted from the end of the nozzle 210, and the atmosphere of the welding place is protected.

<Feeding Device>

The feeding device 300 sends a welding wire wound around a spool to the welding torch 200 in agreement with the progress of welding working. The welding wire to be sent by the feeding device 300 is not particularly limited, and is selected on the basis of the properties of the workpiece W, the welding form, etc., and for example, a solid wire or a wire containing flux is used. The material of the welding wire done not matter, and for example, soft steel may be used, or a material such as stainless steel, aluminum, or titanium may be used. The diameter of the welding wire does not particularly matter; however, in the present embodiment, it is preferable that the upper limit be 1.6 mm and the lower limit be 0.9 mm.

<Welding Power Source>

The welding power source 400 supplies electric power to the welding wire and the workpiece W by a command sent from the control device 600. Thereby, an arc is generated between the welding wire and the workpiece W. In the present embodiment, electric power sent from the welding power source 400 is sent to the feeding device 300 via the power cable 410, and is sent from the feeding device 300 to the welding torch 200 via a conduit tube 420. Then, the electric power is supplied to the welding wire via the contact tip 220 at the end of the welding torch 200.

In the present embodiment, a case where welding is performed with reverse polarity is shown, and the welding power source 400 is connected to the contact tip 220 at the end of the welding torch 200 via a plus (+) power cable 410 and a plus (+) conduit tube 420. On the other hand, the welding power source 400 is connected to the workpiece W via a minus (−) conduit cable 430. However, the embodiment is not limited thereto, and in the case where welding is performed with positive polarity, the welding power source 400 is connected to the workpiece W via a plus (+) power cable, and is connected to the contact tip side via a minus (−) power cable. The current at the time of welding working may be a direct current or an alternating current, and the waveform of the current does not particularly matter, and may be a pulse waveform such as a rectangular wave or a triangular wave.

<Shielding Gas Supply Source>

The shielding gas supply source 500 according to the present embodiment is composed of a container in which shielding gas is enclosed and accessory members such as a valve. Shielding gas is sent from the shielding gas supply source 500 to the feeding device 300 via a gas tube 510, and is sent from the feeding device 300 to the welding torch 200 via the conduit tube 420. The shielding gas sent to the welding torch 200 flows through the welding torch 200, is guided to the nozzle 210, and is jetted from the welding torch 200. As the shielding gas used in the present embodiment, $CO_2$ or Ar, or a mixed gas of these may be given as an example.

A conduction path for functioning as a power cable is formed on the outer cover side of the conduit tube 420 according to the present embodiment, and a protection pipe that protects a welding wire is placed and a flow path of shielding gas is formed in the interior of the conduit tube 420. However, the embodiment is not limited thereto, and for example, a bundle in which a protection pipe for feeding a welding wire to the welding torch 200 is placed at the center and a cable for electric power supply and a hose for shielding gas supply are arranged around the protection pipe may be used. Further, for example, a tube that sends a welding wire and shielding gas, and a power cable may be installed separately.

<Control Device>

The control device 600 according to the present embodiment is connected to the portable welding robot 100 by a control cable 610, and is connected to the welding power source 400 by a control cable 620. Thereby, the operation and the welding conditions of the portable welding robot 100 are controlled. The control device 600 holds teaching data in which an operation pattern, the position of the start of welding, the position of the end of welding, the welding conditions, a weaving operation, etc. of the portable welding robot 100 are prescribed in advance, and makes an instruction of these to the portable welding robot 100 and the welding power source 400 to control the operation and the welding conditions of the portable welding robot 100. The control device 600 of the present embodiment is formed by integration of a controller for performing teaching and a controller having other control functions. However, the embodiment is not limited thereto, and division may be made into a plurality of pieces depending on roles, such as division into two controllers of a controller for performing teaching and a controller having other control functions. Further, although in the present embodiment signals are sent by using the control cables 610 and 620, the embodiment is not limited thereto, and signals may be sent wirelessly.

<Portable Welding Robot>

Figure 2:
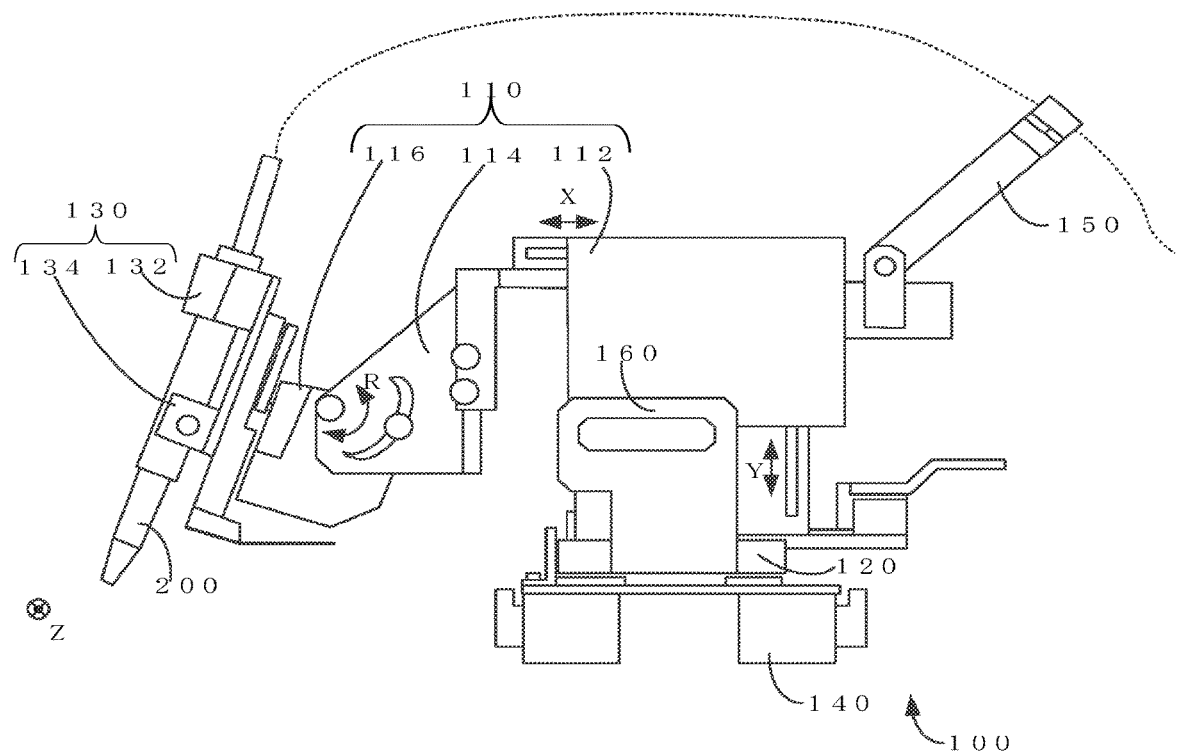
FIG. 2 is a side view schematically showing a portable welding robot according to an embodiment of the present invention.
Figure 3:
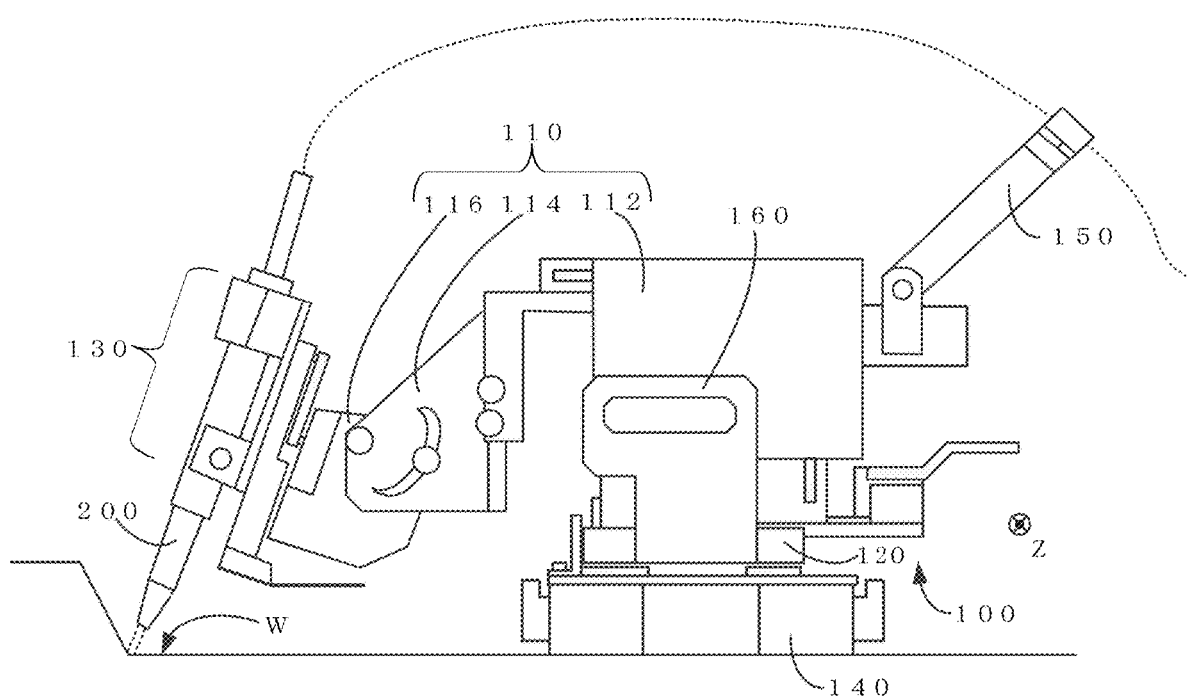
FIG. 3 is a side view schematically showing a situation where welding is performed using the portable welding robot shown in FIG. 2.

Next, with reference to FIGS. 2 and 3, a portable welding robot according to an embodiment of the present invention will be described. FIG. 2 is a side view schematically showing a portable welding robot according to an embodiment of the present invention. FIG. 3 is a side view schematically showing a situation where welding is performed using the portable welding robot shown in FIG. 2.

The portable welding robot 100 according to the present embodiment includes a guide rail 120, a robot main body 110 installed on the guide rail 120, and a torch connection section 130 mounted on the robot main body 110. The robot main body 110 is composed mainly of a main body section 112 installed on the guide rail 120, a fixing arm section 114 attached to the main body section, and a movable arm section 116 attached to the fixing arm section 114 in a rotatable state. The movable arm section 116 is equipped with the torch connection section 130 via a crank 170. The torch connection section 130 is composed of torch clamps 132 and 134 that fix the welding torch 200. A cable clamp 150 that supports the conduit tube 420 that links the feeding device 300 and the welding torch 200 is provided on the opposite side to the side on which the welding torch 200 is mounted.

The robot main body 110 can be driven in a lateral direction as shown by arrow X of FIG. 2, and can be driven also in the up and down direction as shown by arrow Y. The torch connection section 130 equipped with the welding torch 200 can be driven by the crank 170 in a backward and forward oscillating manner in a Z direction, which is the direction perpendicular to the drawing sheet. The movable arm section 116 is, as shown by arrow R, attached to the fixing arm section 114 in a rotatable manner, and can be adjusted to an optimum angle and be fixed. As hereinabove, the robot main body 110 according to the present embodiment can be driven in three degrees of freedom. However, the embodiment is not limited thereto, and a robot main body that can be driven in an arbitrary number of degrees of freedom may be employed in accordance with the use.

By a driving mechanism like that described above, an end portion of the welding torch 200 attached to the torch connection section 130 that is attached to the movable arm section 116 via the crank 170 can be turned to arbitrary sides. Further, the portable welding robot 100 can be driven on the guide rail 120 in the Z axis direction, which is the direction perpendicular to the drawing sheets of FIG. 2 and FIG. 3. The welding torch 200 can perform weaving welding by, while reciprocally moving in the arrow X direction, the robot main body 110 moving in the Z axis direction. Further, by driving by the crank 170, for example, the welding torch 200 can be tilted in accordance with execution conditions such as providing an angle of advance or an angle of sweepback.

A magnet 140 is installed below the guide rail 120, and attachment to the workpiece W can be made by the magnet 140 as shown in FIG. 3. The operator can easily set the portable welding robot 100 on the guide rail 120 by grasping handles 160 on both sides of the portable welding robot 100.

The portable welding robot 100 is driven within the operating strokes in the directions of arrows X, Y, and Z mentioned above. By control by the control device 600 based on input data inputted by the operator, the portable welding robot 100 can start automatic sensing of the welding line, perform automatic sensing of the groove shape, the plate thickness, the start and end points, etc., and calculate welding conditions; thus, can make automatic gas shielded arc welding. However, the embodiment is not limited thereto, and the operator may input numerical values to the control device 600 for part or all of the welding conditions mentioned above.

<Welding Torch>

Figure 4:
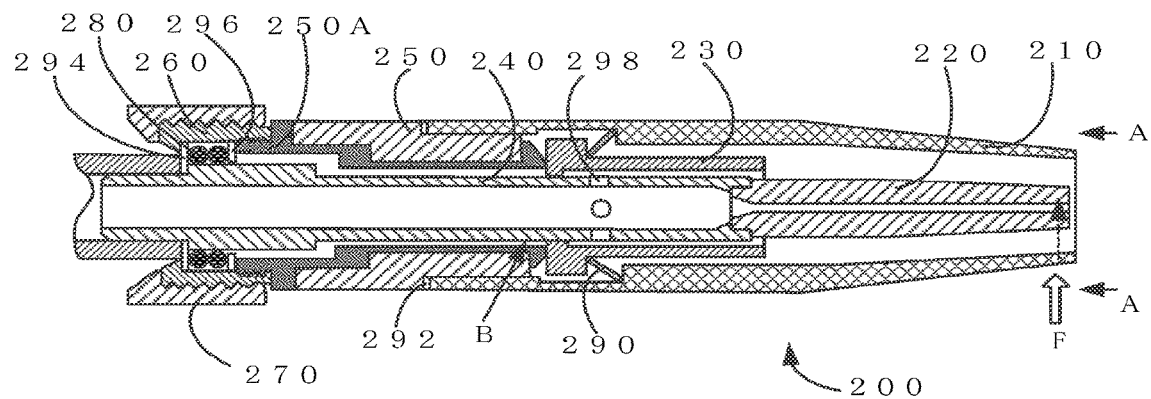
FIG. 4 is a side cross sectional view schematically showing a structure of a welding torch according to an embodiment of the present invention.

Next, a welding torch according to an embodiment of the present invention is described in detail with reference to FIG. 4. FIG. 4 is a side cross sectional view schematically showing a structure of a welding torch according to an embodiment of the present invention.

The welding torch 200 according to the present embodiment includes a tip body 240 connected to the welding torch main body and a contact tip 220 attached to the tip body 240, from the left side of the drawing sheet of the root side of the torch. A plurality of (in the present embodiment, four) holes 298 that jet gas are formed in the tip body 240. An orifice 230 that is formed of a ceramic material and that rectifies gas is fitted in the tip body 240.

On the outside of these components, an insulating cylinder 250 and a nozzle 210 connected to the insulating cylinder 250 are arranged from the left side of the drawing sheet of the root side of the torch so as to cover the outside of the tip body 240 and the contact tip 220. An inside member 250A in contact with the orifice 230 is mounted on the inner surface side of the insulating cylinder 250. The insulating cylinder 250 and the nozzle 210 are connected via a wave washer 292 so that the connection between both is not loosened due to vibration or the like. As is clear from FIG. 4, arrangement is made such that the inner circumferential surfaces of the insulating cylinder 250 and the nozzle 210, and the outer circumferential surfaces of the tip body 240 and the contact tip 220 are apart.

A fixing nut 260 and an insulating cover 270 are mounted on the outside of the insulating cylinder 250 (the inside member 250A) in an end portion on the root side of the insulating cylinder 250 of the left side of the drawing sheet. An O ring 280 is held between the inside member 250A and the fixing nut 260 via washers 294 and 296 arranged at the front and the rear. The inner circumferential surface of the O ring 280 is in contact with the outer circumferential surface of the tip body 240, and it can be said that the insulating cylinder 250 is connected to the tip body 240 via the ring 280.

Thus, the insulating cylinder 250 supported by the elastic force of the O ring in an end portion on the root side and the nozzle 210 attached to the end of the insulating cylinder 250 are arranged with a prescribed gap with the tip body 240 and the contact tip 220 attached to the end of the tip body 240. By such a structure, the insulating cylinder 250 and the nozzle 210 can make tilting with respect to the tip body 240 and the contact tip 220, with an end portion on the root side as the tilting center, because the O ring can make elastic deformation. At this time, a prescribed braking force is applied between the insulating cylinder 250 and the nozzle 210 by a compression spring 290, and smooth movement free from unsteadiness is achieved.

The contact tip 220 will now be described in more detail; the contact tip 220 has a circular cylindrical shape slightly tapering off, and has, at its axial center, a conducting hole that guides a welding wire. The contact tip 220 is formed of a metal material having electrical conductivity, such as copper. A leading taper surface of which the diameter expands toward the rear side is formed in a rear end portion of the conducting hole, and a welding wire is introduced smoothly by the leading taper surface. The contact tip 220 is a member that supplies a welding current to the welding wire and furthermore guides the welding wire.

A welding wire supplied from the feeding device 300 passes through the interior of the conduit tube 420 and enters the welding torch main body, and passes through the welding torch main body and the tip body 240 and enters the conducting hole of the contact tip 220.

On the other hand, the welding power source 400 and the welding torch main body are electrically connected via the power cable 410 and the conduit tube 420. Further, the welding torch main body, the tip body 240, and the contact tip 220 are electrically connected. Thus, a welding current supplied from the welding power source 400 passes from the contact tip 220 through the conducting hole, then flows into the welding wire, and generates an arc.

Shielding gas supplied from the shielding gas supply source 500 flows through the gas tube 510 and the conduit tube 420 and enters the welding torch main body, passes through the interiors of the welding torch main body and the tip body 240, and flows from a plurality of holes of the tip body 240 to the outer circumferential side. Then, shielding gas rectified by the orifice 230 is jetted from the end of the nozzle 210 so as to cover the arc, and protects the atmosphere of the welding place.

(Structure in which Nozzle and Contact Tip are a Relatively Movable)

Figure 5A:
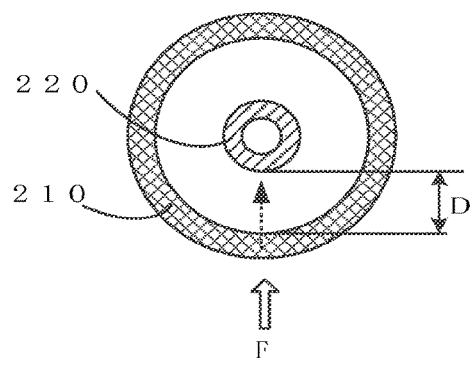
FIG. 5A is a schematic diagram of the welding torch viewed in the direction of arrows A-A of FIG. 4, as seen from the side of jetting of shielding gas, and is a diagram showing the initial state where a nozzle and a contact tip are arranged substantially concentrically.
Figure 5B:
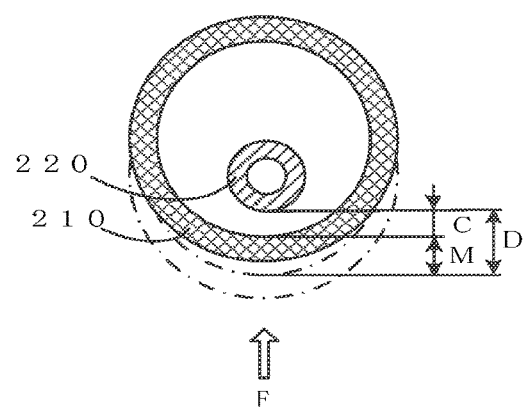
FIG. 5B is a schematic diagram showing a state where the nozzle and the contact tip have moved relatively from the state of FIG. 5A.

Next, a structure in which the nozzle 210 and the contact tip 220 can move relatively by the insulating cylinder 250 and the nozzle 210 tilting with respect to the tip body 240 and the contact tip 220 is described in detail with reference to FIG. 5A and FIG. 5B. FIG. 5A is a schematic diagram of the welding torch viewed in the direction of arrows A-A of FIG. 4, as seen from the side of jetting of shielding gas, and is a diagram showing the initial state where a nozzle and a contact tip are arranged substantially concentrically. FIG. 5B is a schematic diagram showing a state where the nozzle and the contact tip have moved relatively from the state of FIG. 5A.

In the initial state where a load is not applied to the nozzle 210, almost equal elastic forces are applied to the entire circumference of the insulating cylinder 250 from the O ring 280, and therefore the nozzle 210 and the contact tip 220 are arranged almost concentrically as shown in FIG. 5A. From this initial state, when a force F is applied to the end of the nozzle 210 from the lower side as shown by the hollow arrow of FIG. 4, the insulating cylinder 250 and the nozzle 210 tilt counterclockwise with respect to the tip body 240 and the contact tip 220, with an end portion on the root side in contact with the O ring 280 as the tilting center. Thereby, from the state shown in FI G. 5A, the nozzle 210 moves relatively upward with respect to the contact tip 220.

Then, the insulating cylinder 250 and the tip body 240 come into contact at the point shown by arrow B of FI G. 4, and the tilting stops. However, the embodiment is not limited thereto, and for example, the tilting may stop by the nozzle 210 and the flange section of the orifice 230 coming into contact. FIG. 5B shows a positional relationship between the nozzle 210 and the contact tip 220 at this time as seen from the side of jetting of shielding gas. As is clear from FIG. 5B, there is still a prescribed gap between the nozzle 210 and the contact tip 220.

When the application of F is stopped, a return to the initial state shown in FIG. 5A is made due to the elastic force of the O ring 280.

When a nozzle tip gap distance between the inner diameter of the end of the nozzle 210 and the outer diameter of the end of the contact tip 220 in the initial state is denoted by D, the nozzle 210 moves by an amount equal to a movement distance M with respect to the contact tip 220, and the nozzle tip gap distance changes to C. At this time, there is a relationship of C=D−M. That is, the nozzle tip gap distance narrows by an amount equal to the movement distance M. In FIG. 5B, the position of the nozzle 210 in the initial state is shown by the figure of the alternate long and short dash line.

Although a case where the nozzle 210 moves upward with respect to the contact tip 220 is shown in the above description, in the present embodiment it is clear that the nozzle 210 can move in any direction with respect to the contact tip 220 in accordance with the direction in which weighting is applied.

In the present embodiment, the nozzle 210 and the contact tip 220 are arranged concentrically in the initial state where a load is not applied to the nozzle 210. That is, the nozzle tip gap distance D is almost equal throughout the entire circumference. Thus, the periphery of the arc can be covered with shielding gas surely, and the atmosphere of the welding place can be protected. However, the embodiment is not limited thereto, and the nozzle tip gap distance D may vary with regions in the initial state, in accordance with the use.

In gas shielded welding, shielding gas is jetted from the end of the nozzle, and the atmosphere of the welding place can be protected. However, if the shielding gas is disordered by a disturbance such as a groove shape or a wind, the air is drawn in, and the electric potential gradient of the gas is changed. Consequently, the arc length varies, and welding defects such as pore defects resulting from the instability of the arc or nitrogen (N) in the air occur. In site welding in which a portable welding robot is used, there are complicated attitudes and groove shapes involving welding by human hands and further there are cases where welding is performed in the open air, and hence a disturbance that disorders shielding gas is particularly likely to occur. Further, spatter drops occurring due to the instability of the arc stop up the jet port of the nozzle; thus, as welding progresses, the instability of the arc increases, and the increase in the amount of spatter drops and the occurrence of welding defects become more conspicuous.

In the present embodiment, a disturbance can be suppressed by narrowing the inner diameter of the end of the nozzle 210 to raise the flow velocity of gas. In view of the condition, the inner diameter of the end of the nozzle 210 is preferably set within the range of not less than 10 mm and not more than 20 mm, and is more preferably set within the range of not less than 12 mm and not more than 18 mm. The arc can be stabilized by narrowing the inner diameter of the end of the nozzle. However, when the inner diameter of the end is made narrower, the jet port of the nozzle is more likely to be choked by spatter drops. That is, even in the case where the arc is stable and the amount of spatter drops occurring is small in the initial stage, when welding is performed continuously, spatter drops adhere to the jet port gradually, and eventually shielding gas failure occurs. In the case where the inner diameter of the end of the nozzle is narrowed, the choking of the nozzle due to spatter drops is more conspicuous; thus, simply narrowing the port diameter of the nozzle alone does not allow uses for continuous welding.

Thus, in the present embodiment, the inner diameter of the end of the nozzle 210 is set within the range of not less than 10 mm and not more than 20 mm, and the nozzle 210 and the contact tip 220 have a relatively movable structure as mentioned above.

Originally from the viewpoint of preventing damage to the torch, it is preferable that, during weaving welding, the nozzle and the wall surface of the groove be not in contact with each other in the groove. However, in the present embodiment, the nozzle 210 can move in the radius direction with the contact tip 220 as the center; therefore, the wall surface of the groove and the nozzle are allowed to collide together without worry about damage to the torch, and spatter drops adhering to the jet port of the nozzle can be removed by the impact of the collision. Furthermore, by the change in the nozzle tip gap distance, which is the difference between the inner diameter of the end of the nozzle 210 and the outer diameter of the end of the contact tip 220, spatter drops adhering between the nozzle 210 and the contact tip 220 can be removed mechanically. That is, even during welding, adhering spatter drops can be removed by performing weaving welding.

As hereinabove, the portable welding robot 100 according to the present embodiment is particularly effective for shielding gas welding in the case where 100% $CO_2$ gas, which is frequently used in site welding and with which the arc is likely to be unstable and spatter drops occur conspicuously, is used. In the present embodiment, the occurrence of spatter drops can be suppressed by reducing the inner diameter of the end of the nozzle 210, and further, even if spatter drops adhere to the nozzle 210, since the nozzle 210 and the contact tip 220 have a relatively movable structure, spatter drops adhering to the nozzle 210 can be removed by changing the nozzle tip gap distance during weaving welding. In particular, in the case where the inner diameter of the end of the nozzle is within the range of not less than 10 mm and not more than 20 mm, the occurrence of spatter drops can be suppressed effectively, and spatter drops adhering to the nozzle 210 can be removed.

By such a structure, the occurrence of spatter drops adhering to the nozzle 210 can be prevented and shielding gas failure can be prevented even in continuous welding. Thereby, during welding, the stabilization of the arc can be maintained all the time, and the reduction in the amount of spatter drops can be continued and welding defects can be suppressed; thus, a contribution can be made to improvement in working efficiency.

Thereby, a welding device and a welding method that enable longtime continuous welding to improve working efficiency can be provided.

Further, in the present embodiment, the nozzle tip gap distance D between the inner diameter of the end of the nozzle 210 and the outer diameter of the end of the contact tip 220 in the initial state is formed so as to be within the range of not less than 2 mm and not more than 7 mm. By setting the nozzle tip gap distance D within the range of not less than 2 mm and not more than 7 mm, the stabilization of the arc and the suppression of choking due to spatter drops of the jet port of the nozzle can be balanced.

To obtain an effective spatter drop removal effect without causing fusion bonding between the nozzle 210 and the contact tip 220, it is important that the relative movement distance M between the nozzle 210 and the contact tip 220 be set within a prescribed range with respect to the nozzle tip gap distance D in the initial state. The following has been found on the basis of various studies and tests regarding this.

In the case where the proportion M/D of the relative movement distance M to the nozzle tip gap distance D is less than 30%, the movement range is small, and the spatter drop removal effect is low. On the other hand, in the case where M/D is larger than 90%, the possibility that fusion bonding will occur between the nozzle 210 and the contact tip 220 is increased. That is, it has been found that the relative movement distance M between the nozzle 210 and the contact tip 220 is preferably within the range of not less than 30% and not more than 90% of the nozzle tip gap distance D.

As hereinabove, in the case where the nozzle tip gap distance D between the inner diameter of the end of the nozzle 210 and the outer diameter of the end of the contact tip 220 in the initial state is within the range of not less than 2 mm and not more than 7 mm, and the relative movement distance M between the nozzle 210 and the contact tip 220 is within the range of not less than 30% and not more than 90% of the nozzle tip gap distance D, an effective spatter drop removal effect can be obtained while the stabilization of the arc and the suppression of choking due to spatter drops of the jet port of the nozzle are balanced moderately and fusion bonding between the nozzle 210 and the contact tip 220 is prevented.

From the viewpoint of surely preventing fusion bonding between the nozzle 210 and the contact tip 220, it is presumed to be more preferable to be within the range of not less than 30% and not more than 85%.

Depending on the use or the welding site, there is a case where it is preferable to alter the relative movement distance M between the nozzle 210 and the contact tip 220. In this case, the alteration can be made by making replacement with an insulating cylinder 250 having a different inner diameter or a tip body 240 having a different outer diameter to alter the position where the insulating cylinder 250 and the tip body 240 come into contact.

Further, for example, in the case where the insulating cylinder 250 has an elliptical cross sectional shape, the relative movement distance M between the nozzle 210 and the contact tip 220 can be varied between the direction of oscillation of the welding torch 200 that performs weaving welding and the direction of progress of the portable welding robot 100 orthogonal to the direction of oscillation. Thereby, sufficient shielding gas can be supplied, and the spatter drop removal effect can be enhanced.

Although in the above embodiment an O ring is used as an elastic material, the embodiment is not limited thereto, and some other arbitrary member including a spring or some other elastic body may be used. Further, the structure mentioned above is only an example, and some other arbitrary mechanism may be used as long as it is a mechanism that allows the nozzle 210 and the contact tip 220 to relatively move.

It has been found that, in the case where, in welding using the portable welding robot 100 mentioned above, the flow rate of shielding gas jetted from the nozzle 210 is within the range of not less than 15 L/min and not more than 50 L/min and the flow velocity of shielding gas is within the range of not less than 1 m/sec and not more than 10 m/sec, the stabilization of the arc and a reduction in the amount of spatter drops are achieved effectively.

(Welding with Pulse Waveform Using a Welding Current)

As mentioned above, site welding in which a portable welding robot is frequently used has large disturbance, and is likely to fall into the instability of the arc. In the case where the arc is stable, in general, the amount of spatter drops is reduced by using a welding current with a pulse waveform. However, if a situation where the arc is unstable is brought about, droplet transfer goes out of order, and the amount of spatter drops is increased as compared to the case of a direct current of a constant voltage (having no pulse). Hence, in welding in which a portable welding robot is used, a pulse waveform has not been used in view of these problems. In the present embodiment, the arc can be stabilized even in continuous welding as mentioned above, and thus a pulse waveform may be used in order to further reduce the amount of spatter drops. In particular, a pulse waveform used in the creation of a 100% $CO_2$ gas atmosphere, which is frequently used in site welding, will now be described below in detail with reference to FIG. 6 and FIG. 7.

Figure 6:
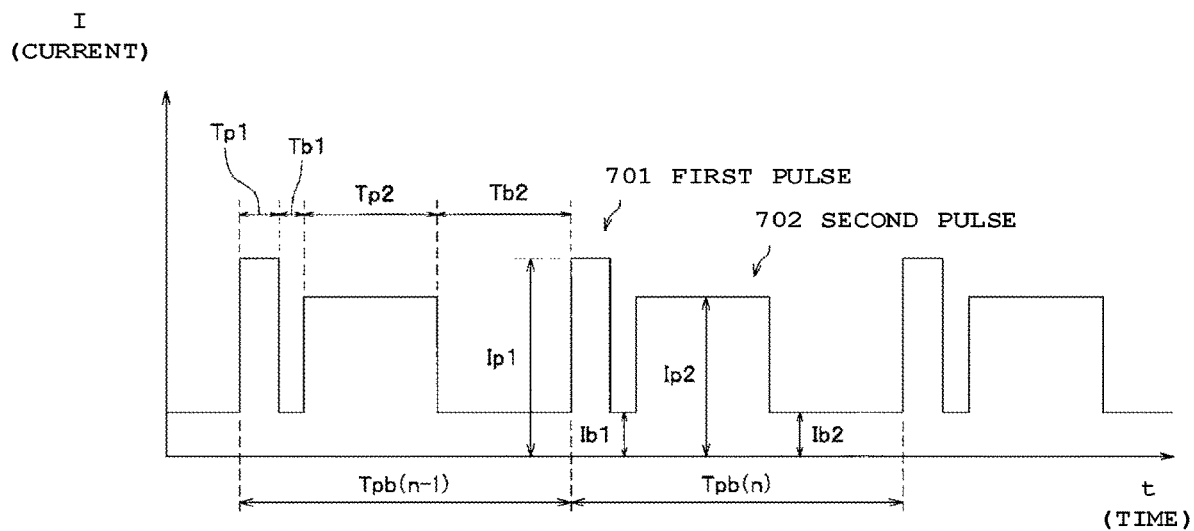
FIG. 6 is a diagram showing an example of a pulse waveform generated by a control device according to an embodiment of the present invention.
Figure 7:
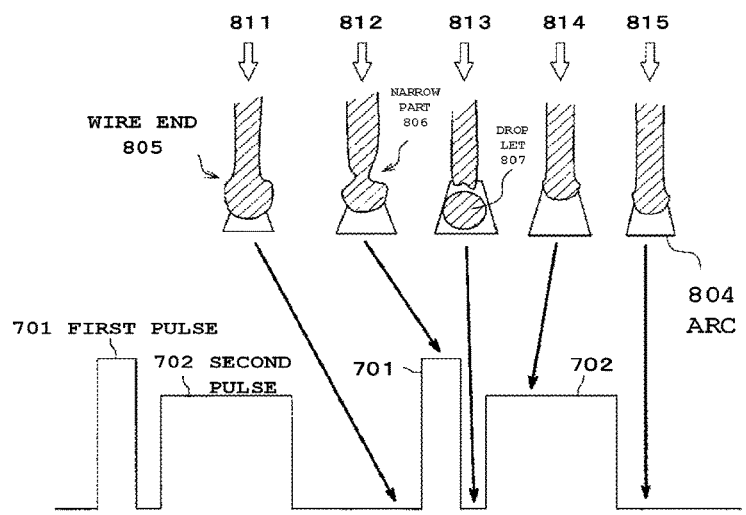
FIG. 7 is an explanatory diagram schematically showing a temporal change of an end portion of a welding wire based on a pulse waveform generated by a control device according to an embodiment of the present invention.

FIG. 6 is a diagram showing an example of a pulse waveform generated by a control device according to an embodiment of the present invention. Here, the horizontal axis represents time, and the vertical axis represents the welding current supplied to the welding wire. FIG. 7 is an explanatory diagram schematically showing a temporal change of an end portion of a welding wire based on a pulse waveform generated by a control device according to an embodiment of the present invention.

An arc length control method of the present embodiment is on the assumption that consumable electrode type pulse arc welding is used in which different two kinds of pulse waveform like those shown in FIG. 6 are alternately generated during one period of the pulse period on the basis of waveform parameters set in advance and are outputted to the welding power source, and thereby one droplet is transferred.

A first pulse 701 shown in FIG. 6 is a first pulse waveform for detaching a droplet sent from the wire end.

A span including a peak span Tp1 and a base span Tb1 of the first pulse 701 is referred to as a first pulse span. Herein, a peak current value Ip1 and a base current value Ib1 are set in the first pulse 701. The peak current value Ip1 is larger than a peak current value Ip2 of a second pulse 702.

The second pulse 702 shown in FIG. 6 is a second pulse waveform for shaping a droplet. A span including a peak span Tp2 and a base span Tb2 of the second pulse 702 is referred to as a second pulse span. Herein, a peak current value Ip2 and a base current value Ib2 are set in the second pulse 702.

One period of the pulse period is composed of the first pulse span and the second pulse span. One period of the pulse period is a span during which the first pulse 701 and the second pulse 702 are outputted in this order. In FIG. 6, the pulse period of the (n−1)th time indicating the last time is shown as Tpb(n−1). Further, the pulse period of the nth time indicating this time is shown as Tpb(n).

In practice, there are a rise slope span from the base current to the peak current (a first pulse rise slope span and a second pulse rise slope span) and a pulse fall slope span from the peak current to the base current. However, herein, these slope spans are not included, and in FIG. 6 the shapes of the first pulse 701 and the second pulse 702 are shown by rectangular shapes.

The control device 600 according to the present embodiment detects the arc voltage and the welding current during welding. When the detachment of a droplet or a state immediately before the detachment of a droplet like that shown in FIG. 7 is detected on the basis of at least one of the welding current, the arc voltage, and the ratio between the arc voltage and the welding current (V/I; resistance), immediately the current value of the first pulse 701 is switched to a prescribed value lower than the current value at the time of detection or to a slope span. In FIG. 7, an example of switching to a base current is shown. Details of droplet transfer are as follows.

In FIG. 7, a wire end 805 shown by reference sign 811 is a result of growth during a second pulse peak span (Tp2) after a droplet was detached in a pulse period Tpb(n−1) of the last time. The current is reduced sharply in a second base span (Tb2); therefore, upward pushup force acting on the droplet is weakened, and the droplet is shaped to be suspended at the wire end 805.

Subsequently, upon entering a first pulse peak span (Tp1), as shown by reference sign 812, the droplet is deformed by electromagnetic pinch force due to the peak current, and a narrow part 806 is generated rapidly. Triggered by sensing such a state immediately before the detachment of the droplet, switching is promptly made to the first base current or a prescribed current lower than the current at the time of sensing even during the first pulse peak span or during the first pulse fall slope span. The condition is set such that, at the moment when the arc has moved to the wire side after detachment, there is a state where the current is reduced, as shown by reference sign 813. Thereby, the amount of small spatter drops due to scattering of the narrow part 806 portion of the wire or scattering of the residual molten liquid after detachment can be reduced drastically.

Subsequently, as shown by reference sign 814, a droplet is grown in a second pulse peak span on the basis of a second pulse peak current value (Ip2) that is set in advance at such a level that the molten liquid remaining on the wire after droplet detachment is not detached or scattered. Then, as shown by reference sign 815, in a second base span (Tb2), a return to the state shown by reference sign 811 again is made while the shaping of a droplet is performed; thus, the transfer of one droplet per period can be made very regularly.

As hereinabove, it is preferable to employ, as a pulse waveform used in the creation of a 100% $CO_2$ gas atmosphere, which is frequently used in site welding, a pulse waveform in which a combination of a first pulse and a second pulse is set as one period, and the first pulse has a higher peak current value than the second pulse and the second pulse has a longer peak span than the first pulse.

In the creation of a 100% CO2 gas atmosphere, the droplet transfer form is globular transfer in which a droplet obtains a size of not less than the diameter of the electrode wire and transfers; hence, a method that detaches droplets regularly can suppress the occurrence of spatter drops most. Thus, the first pulse is provided in order to detach a droplet increased in size. The second pulse is provided in order to melt a droplet up to a certain size while preventing swinging due to arc reaction force. The detachment of a droplet in which swinging is suppressed is promoted again by the first pulse, and droplet transfer is completed. That is, the first pulse and the second pulse constitute a special pulse waveform that detaches one droplet stably. Thus, in view of the difference in activity between the first pulse and the second pulse, it is preferable that the first pulse be set to have a higher peak current value than the second pulse and the second pulse be set to have a longer peak span than the first pulse.

To sum up the above, a preferred pulse waveform is a pulse waveform in which a combination of a first pulse and a second pulse is set as one period, and the first pulse has a higher peak current value than the second pulse and the second pulse has a longer peak span than the first pulse.

Thereby, the occurrence of small spatter drops can be reduced drastically, and the transfer of one droplet per period can be made very regularly.

It has been found that, to surely exhibit the action and effect mentioned above, it is more preferable to use a pulse waveform like below.

(1) The peak current value of the first pulse is within the range of not less than 400 A and not more than 600 A, (2) the peak current value of the second pulse is within the range of not less than 300 A and not more than 500 A, (3) the peak span of the first pulse is within the range of not less than 0.5 msec and not more than 3.5 msec, and (4) the peak span of the second pulse is within the range of not less than 1.5 msec and not more than 5.5 msec.

It is possible to employ a method in which welding using, as the welding current, a direct current of a constant voltage not having a pulse waveform is performed during a prescribed time after the start of welding and during a prescribed time before the end of welding, during the prescribed times the arc being likely to be unstable, and welding using a welding current having a pulse waveform is performed during the intermediate span.

When the regularity of droplet transfer is broken due to some kind of disturbance in welding using the pulse waveform mentioned above, in the pulse waveform a combination of a first pulse and a second pulse being set as one period, it may be possible to, subsequently to the first pulse, output a third pulse different from the second pulse. The third pulse may be a pulse for detaching a droplet compulsorily, or may be a pulse for performing shaping over again on another occasion so that a droplet can be detached smoothly. Thereby, the span required for recovery to a normal state when the regularity of droplet transfer is broken can be made shorter. Accordingly, the amounts of spatter drops and fumes occurring during the span required for recovery to a normal state can be reduced.

<Multilayer Welding>

The pulse waveform mentioned above may be used also for multilayer gas shielded arc welding. In the case of multilayer welding, a welding method like that mentioned below may be given as an example.

(1) Only a first layer,
(2) the first layer to a second layer, or
(3) the first layer to a third layer are welded using, as the welding current, a direct current of a constant voltage not having a pulse waveform, and the remaining layers are welded using a welding current having a pulse waveform similar to the above.

In detail, the remaining layers are welded using a welding current having a pulse waveform in which a combination of a first pulse and a second pulse is set as one period, and the first pulse has a higher peak current value than the second pulse and the second pulse has a longer peak span than the first pulse.

(Control Device Including Droplet Detachment Detection Section)

In welding using the pulse waveform mentioned above, it is important to detect, in the peak span of the first pulse, the detachment of a droplet formed at the end of the welding wire fused by the arc or a state immediately before the detachment. In the following, detecting the detachment of a droplet and detecting a state immediately before the detachment of a droplet are collectively written as "detecting the detachment of a droplet".

As mentioned above, the detachment of a droplet may be detected on the basis of at least one of the welding current, the arc voltage, and the ratio between the arc voltage and the welding current (V/I; resistance).

Figure 8:
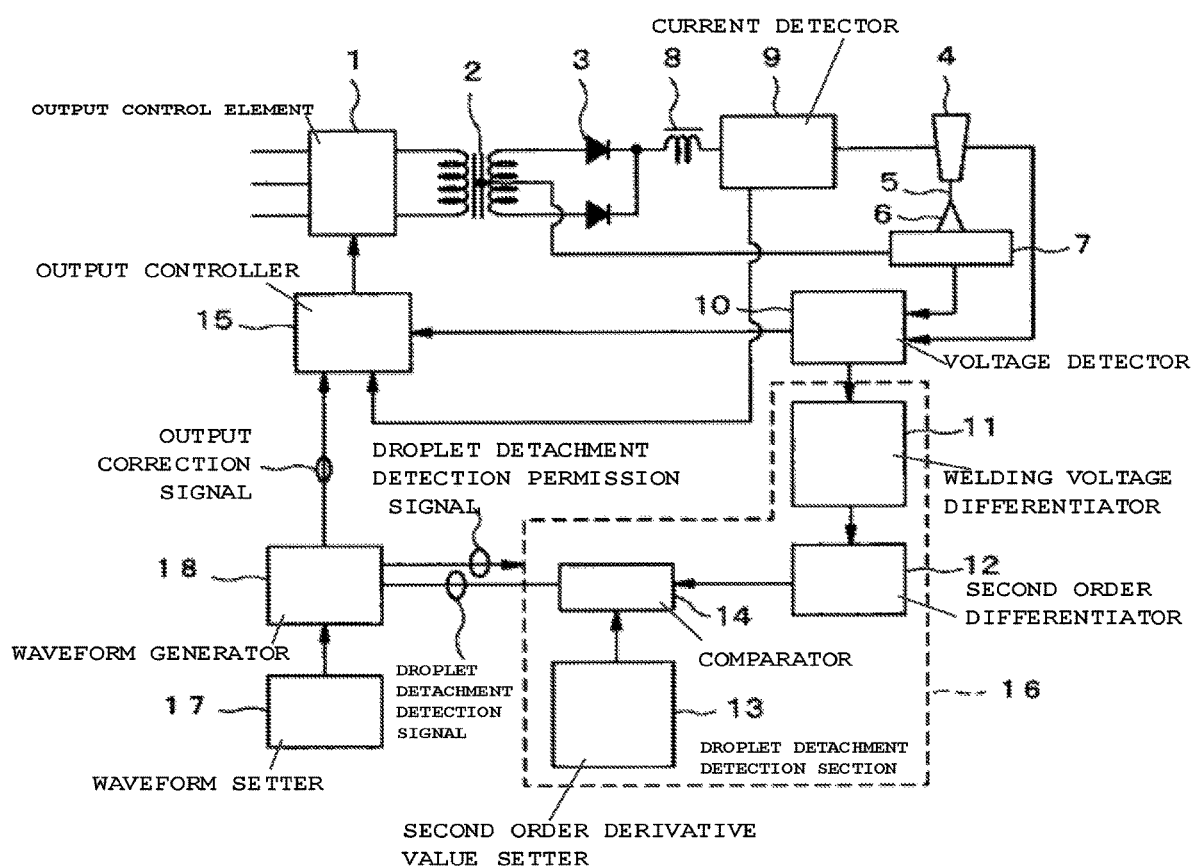
FIG. 8 is a block diagram showing an example of a control device including a droplet detachment detection section that performs detection using a time second order derivative value.

Next, as an example of "based on at least one of the welding current, the arc voltage, and the ratio between the arc voltage and the welding current (V/I; resistance)", a case where the detachment of a droplet is detected using the time second order derivative value of the arc voltage or the like is described with reference to FIG. 8. FIG. 8 is a block diagram showing an example of a control device including a droplet detachment detection section that performs detection using a time second order derivative value.

In the present embodiment, the time second order derivative value of the arc voltage is used. An output control element 1 is connected to a three phase alternating current power source (not illustrated); a current given to the output control element 1 is given to a contact tip 4 via a transformer 2, a rectifying section 3 formed of a diode, a direct current reactor 8, and a current detector 9 that detects a welding current. A welding object material 7 is connected to the lower power source side of the transformer 2, and a welding arc 6 is generated between a welding wire 5 that is inserted through the contact tip 4 to be supplied with electricity and the welding object material 7.

The arc voltage between the contact tip 4 and the welding object material 7 is detected by a voltage detector 10, and is inputted to an output controller 15. The detection value of the welding current is also inputted to the output controller 15 from the current detector 9, and on the basis of the arc voltage and the welding current, the output controller 15 controls the welding current and the arc voltage to be supplied to the wire 5.

The arc voltage detected by the voltage detector 10 is inputted to an arc voltage differentiator 11 of a droplet detachment detection section 16, and the time first order derivative is calculated in the arc voltage differentiator 11. Next, the first order derivative value of the arc voltage is inputted to a second order differentiator 12, and the time second order derivative of the arc voltage is calculated in the second order differentiator 12. After that, the time second order derivative value is inputted to a comparator 14. A second order derivative set value (a threshold) is inputted and set in a second order derivative value setter 13. The comparator 14 compares the second order derivative value sent from the second order differentiator 12 and the set value (the threshold) sent from the second order derivative value setter 13, and outputs a droplet detachment detection signal at the moment when the second order derivative value has exceeded the set value. The moment when the second order derivative value has exceeded the set value is determined as indicating the detection of the detachment of a droplet.

The droplet detachment detection signal is inputted to a waveform generator 18. The waveform of the welding current after droplet detachment is controlled in the waveform generator 18, and an output correction signal is inputted to the output controller 15. When a droplet detachment detection signal is inputted to the waveform generator 18, the waveform generator 18, during a span set in the waveform generator 18, outputs a control signal (an output correction signal) to the output controller 15 so that the current is a welding current value lower than the welding current value at the time of detection. A waveform setter 17 is a section that inputs to the waveform generator 18 the span during which an output correction signal is to be outputted and the degree at which the welding current is to be reduced, and the span during which an output correction signal is to be outputted and the degree at which the welding current is to be reduced are set in the waveform generator 18 by the waveform setter 17.

Here, the droplet detachment detection signal is a signal that is outputted when the detachment of a droplet is detected. When a droplet is being detached, the root of the droplet existing at the wire end narrows, and the narrowing progresses, and as a result, the arc voltage and the resistance rise. Further, when the droplet is detached, the arc length is lengthened, and accordingly, the arc voltage and the resistance rise. In the case where this is detected by the voltage and the resistance value, or the derivative values of these, when a welding condition is changed during welding, the droplet detachment detection section is influenced by the change in the welding condition and frequently makes false detection, and causes an increase in the amount of spatter drops. However, in the case of detection by means of the second order derivative value according to the present embodiment, even when a welding condition is changed during welding, the detachment of a droplet can be detected accurately without influence by the change. Further, a second order derivative value equivalent to a change in voltage or arc resistance due to narrowing immediately before droplet detachment may be set by the second order derivative value setter 13, and thereby the detachment of a droplet can be detected precisely to control the welding waveform. Thus, it is expected that a problem that a molten liquid remaining at the end of the welding wire is blown off and small spatter drops are generated will be solved.

A description will now be given on output correction after the detachment of a droplet is thus detected. Necessary parameters such as currents and voltages are set by the waveform setter 17. The output controller 15 inputs signals sent from the current detector 9, the voltage detector 10, and the waveform generator 18, and controls the output control element 1; thereby, controls the arc. In the case where a droplet detachment detection signal is not inputted to the waveform generator 18, a control signal is outputted to the output control element 1 so that the detection current of the current detector 9 and the detection voltage of the voltage detector 10 are the current and the voltage set by the waveform setter 17. When a droplet detachment detection signal of the droplet detachment detection section 16 is inputted to the waveform generator 18, the waveform generator 18, during a span set by the waveform setter 17, outputs an output correction signal to the output controller 15 so that the current is a welding current set by the waveform setter 17. The welding current at this time is lower than the welding current at the time of detection; therefore, arc reaction force that pushes a droplet up is weakened, and the droplet transfers to the molten pool without greatly deviating from the wire extension direction. Therefore, it is less likely that a droplet will scatter as spatter drops.

As hereinabove, when the droplet detachment detection section according to the present embodiment has detected the detachment of a droplet in a peak span of a first pulse on the basis of the time second order derivative value of the arc voltage, the time second order derivative value of the welding current, or the time second order derivative value of the ratio between the arc voltage and the welding current (V/I; resistance) obtained from the voltage detector 10 and/or the current detector 9, the droplet detachment detection section performs control processing that reduces the peak current value of the first pulse.

In this way, the detachment of a droplet can be detected to control the welding waveform on the basis of at least one of the welding current, the arc voltage, and the ratio between the arc voltage and the welding current (V/I: resistance); thus, it is expected that a problem that a molten liquid remaining at the end of the welding wire is blown off and small spatter drops are generated will be solved.

The accuracy of data detected by the current detector 9 and the voltage detector 10 is important in order for the droplet detachment detection section 16 to detect the detachment of a droplet accurately with little time delay. When the length of the power cable that supplies electric power to the welding torch 200 is long, the decreases and the time lags of the voltage value and the current value during supply from the welding power source 400 to the welding torch 200 are considerable due to the electric resistance of the power cable. Consequently, the accuracy of the current value detected by the current detector 9 provided on the welding power source 400 side and the accuracy of the voltage value detected by the voltage detector 10 are reduced.

The electric resistance of the cable is in proportion to the cable length, and is in inverse proportion to the cross sectional area of the cable. Thus, requirements whereby the droplet detachment detection section 16 can detect the detachment of a droplet precisely have been studied using the cable length of the power cable that connects the welding power source 400 and the portable welding robot 100 together and the cross sectional area of the cable.

As a result, it has been found that, when the cable length of the power cable that connects the welding power source 400 and the portable welding robot 100 together is denoted by L mm and the cable cross sectional area is by S mm$^2$, the droplet detachment detection section can detect the detachment of a droplet precisely in the case where the rate of L to S (L/S) has the relationship of L/S≤10000. The unit of L/S is 1/mm.

EXAMPLES

Next, test 1 and test 2 in which welding tests were actually performed using welding torches according to the above embodiment, etc. are described.

(Test Conditions)

Basic test conditions common to test 1 and test 2 are shown below.

(1) Welding wire: JIS Z3312, 2009 YGW11, a linear shape, 1.2 mm
(2) Workpiece: SM490B, the plate thickness: 12 mm
(3) Shielding gas: 100% $CO_2$
(4) Welding conditions
  (a) Welding current: 280 to 300 A
  (b) Arc voltage: 34 to 36 V
  (c) Groove: an L shape groove
  (d) Stack: three layers, three passes
  (e) Route spacing: 4 mm
  (f) Heat input conditions: not more than 40 kJ/cm
  (g) Welding length: 350 mm (Evaluation Method)

In both test 1 and test 2, the test results were evaluated from three points of continuous weldability, spatter drop condition, and welding defects.

(1) Continuous Weldability

In the case where three layer, three pass welding was implemented continuously without a stop due to spatter drop removal working for the welding nozzle, the test result was determined as "○" (good). On the other hand, in the case where the arc became unstable and the welding stopped due to a failure of shielding gas supply, etc., the result was determined as "x" (poor).

(2) Spatter Drop Condition

Evaluation was made by the amount of spatter drops adhering to the surroundings of the last layer. In more detail, evaluation was made by the amount of spatter drops adhering to an area extending 50 mm in welding length and extending 25 mm on the lower plate side and 25 mm on the standing plate side from the welding line.

(a) A result in which the size of the spatter drop was not more than 1.0 mm was evaluated as "⊙" (excellent).

(b) A result in which not less than 1 and not more than 5 spatter drops each with a size of more than 1.0 mm adhered was evaluated as "○" (good).

(c) A result in which not less than 6 and not more than 10 spatter drops each with a size of more than 1.0 mm adhered was evaluated as "Δ" (fair).

(d) A result in which a state where more than 11 spatter drops each with a size of more than 1.0 mm adhered was seen was assessed as the adhesion of spatter drops being considerable and welding workability being inferior, and was evaluated as "x" (poor).

(3) Welding Defects

A result in which there was no defect in the external appearance of the beads and in an ultrasonic flaw inspection test was evaluated as "○" (good), and a result in which there was a defect was evaluated as "x" (poor).

(Test 1)

Next, the results of test 1 in which welding tests were performed using welding torches according to an embodiment of the present invention and conventional welding torches are described with reference to Table 1 to Table 4. In test 1, welding based on a direct current of a constant voltage not using a pulse waveform was performed. Examples in which welding torches according to an embodiment of the present invention were used are shown in test numbers 1 to 19. In Comparative Examples of test numbers 40 to 43, the nozzle and the contact tip have a relatively movable structure, and in Comparative Examples of test numbers 44 and 45, the nozzle and the contact tip have a conventional structure of being unable to relatively move.

Specifications of welding nozzles, and the flow rates and the flow velocities of shielding gases in Examples are shown in Table 1, and specifications of welding nozzles, and the flow rates and the flow velocities of shielding gases in Comparative Examples are shown in Table 2. The results of test 1 in Examples are shown in Table 3, and the results of test 1 in Comparative Examples are shown in Table 4. The cable length (L: mm) of the power cable of each of test numbers 1 to 19 and test numbers 40 to 45 was set to 1000 mm, and the cable diameter (Dc: mm) was set to 17 mm.

TABLE 1

| No. | Inner diameter of nozzle: Dn (mm) | Outer diameter of tip: Dt (mm) | Nozzle tip gap distance: (Dn − Dt)/2 (mm) | Movable distance (mm) | Ratio (%) | Flow rate of gas: (L/min) | Flow velocity of gas: (m/s) |
|---|---|---|---|---|---|---|---|
| 1 | 14 | 6 | 4 | 3 | 75 | 25 | 3.32 |
| 2 | 20 | 6 | 7 | 5 | 71 | 25 | 1.46 |

TABLE 1-continued

| No. | Inner diameter of nozzle: Dn (mm) | Outer diameter of tip: Dt (mm) | Nozzle tip gap distance: (Dn − Dt)/2 | Movable distance (mm) | Ratio (%) | Flow rate of gas: (L/min) | Flow velocity of gas: (m/s) |
|---|---|---|---|---|---|---|---|
| 3 | 18 | 6 | 6 | 4 | 67 | 25 | 1.84 |
| 4 | 16 | 6 | 5 | 4 | 80 | 25 | 2.41 |
| 5 | 12 | 6 | 3 | 2 | 67 | 25 | 4.91 |
| 6 | 10 | 6 | 2 | 1.5 | 75 | 25 | 8.29 |
| 7 | 14 | 6 | 4 | 1 | 25 | 25 | 3.32 |
| 8 | 14 | 6 | 4 | 1.3 | 33 | 25 | 3.32 |
| 9 | 14 | 6 | 4 | 3.5 | 88 | 25 | 3.32 |
| 10 | 14 | 6 | 4 | 3.8 | 95 | 25 | 3.32 |
| 11 | 14 | 4 | 5 | 4 | 80 | 25 | 2.95 |
| 12 | 16 | 4 | 6 | 4 | 67 | 25 | 2.21 |
| 13 | 18 | 4 | 7 | 6 | 86 | 25 | 1.72 |
| 14 | 20 | 4 | 8 | 6 | 75 | 25 | 1.38 |
| 15 | 14 | 6 | 4 | 3 | 75 | 15 | 1.99 |
| 16 | 14 | 6 | 4 | 3 | 75 | 30 | 3.98 |
| 17 | 14 | 6 | 4 | 3 | 75 | 50 | 6.63 |
| 18 | 18 | 4 | 7 | 5 | 71 | 15 | 1.03 |
| 19 | 12 | 6 | 3 | 2 | 67 | 50 | 9.83 |

TABLE 2

| No. | Inner diameter of nozzle: Dn (mm) | Outer diameter of tip: Dt (mm) | Nozzle tip gap distance: (Dn − Dt)/2 | Movable distance (mm) | Ratio (%) | Flow rate of gas: (L/min) | Flow velocity of gas: (m/s) |
|---|---|---|---|---|---|---|---|
| 40 | 22 | 6 | 8 | 3 | 38 | 25 | 1.18 |
| 41 | 8 | 6 | 1 | 0.5 | 50 | 25 | 18.96 |
| 42 | 18 | 4 | 7 | 3 | 43 | 10 | 0.69 |
| 43 | 12 | 6 | 3 | 1.5 | 50 | 55 | 10.81 |
| 44 | 14 | 6 | — | — | — | 25 | 3.32 |
| 45 | 22 | 6 | — | — | — | 25 | 1.18 |

TABLE 3

| No. | Evaluation | | | |
|---|---|---|---|---|
| | Continuous weldability | Spatter drop condition | Welding defects | |
| 1 | ○ | ○ | ○ | Example |
| 2 | ○ | Δ | ○ | Example |
| 3 | ○ | ○ | ○ | Example |
| 4 | ○ | ○ | ○ | Example |
| 5 | ○ | ○ | ○ | Example |
| 6 | ○ | Δ | ○ | Example |
| 7 | ○ | Δ | ○ | Example |
| 8 | ○ | ○ | ○ | Example |
| 9 | ○ | ○ | ○ | Example |
| 10 | ○ | Δ | ○ | Example |
| 11 | ○ | ○ | ○ | Example |
| 12 | ○ | ○ | ○ | Example |
| 13 | ○ | ○ | ○ | Example |
| 14 | ○ | Δ | ○ | Example |
| 15 | ○ | ○ | ○ | Example |
| 16 | ○ | ○ | ○ | Example |
| 17 | ○ | ○ | ○ | Example |
| 18 | ○ | ○ | ○ | Example |
| 19 | ○ | ○ | ○ | Example |

TABLE 4

| No. | Evaluation | | | |
|---|---|---|---|---|
| | Continuous weldability | Spatter drop condition | Welding defects | |
| 40 | ○ | X | X | Comparative Example |
| 41 | X | X | X | Comparative Example |
| 42 | X | X | X | Comparative Example |
| 43 | ○ | Δ | X | Comparative Example |
| 44 | X | X | X | Comparative Example |
| 45 | X | X | X | Comparative Example |

<Inner Diameter of End of Nozzle>

In all of the Examples of test numbers 1 to 19, the inner diameter of the end of the nozzle is in the range of 10 mm to 20 mm. These Examples have been evaluated as "○" (good) in both continuous weldability and welding defects. For spatter drop condition, they have been evaluated as "○" (good) or "Δ" (fair). As hereinabove, it has been revealed that, in the case where the nozzle and the contact tip have a relatively movable structure and the inner diameter of the end of the nozzle is within the range of not less than 10 mm and not more than 20 mm, there is sufficient performance in continuous weldability, spatter drop condition, and welding defects.

Further, most of the Examples in which the inner diameter of the end of the nozzle is in the range of 12 mm to 18 mm were determined as "◯" (good) in spatter drop condition, and it has been revealed that the inner diameter of the end of the nozzle is more preferably in the range of 12 mm to 18 mm.

On the other hand, the Comparative Example of test number 41, in which the inner diameter of the end of the nozzle is less than 10 mm, has been evaluated as "x" (poor) in all the points of continuous weldability, spatter drop condition, and welding defects. Also the Comparative Example of test number 45, in which the inner diameter of the end of the nozzle is larger than 20 mm and the nozzle and the contact tip have a structure of being unable to relatively move, has been evaluated as "x" (poor) in all the points of continuous weldability, spatter drop condition, and welding defects. The Comparative Example of test number 40, in which the inner diameter of the end of the nozzle is larger than 20 mm, has been evaluated as "x" (poor) in the points of spatter drop condition and welding defects.

As hereinabove, it has been verified that, in the case where the nozzle and the contact tip have a relatively movable structure and the inner diameter of the end of the nozzle is within the range of not less than 10 mm and not more than 20 mm, the occurrence of spatter drops can be suppressed effectively, and spatter drops adhering to the nozzle can be removed.

<Nozzle Tip Gap Distance>

In all of the Examples of test numbers 1 to 19, the nozzle tip gap distance is within the range of not less than 2 mm and not more than 7 mm. In the Examples except test numbers 7 and 10, the relative movement distance between the nozzle and the contact tip is within the range of not less than 30% and not more than 90% of the nozzle tip gap distance. Most of these Examples have been determined as "◯" (good) in spatter drop condition.

On the other hand, the Example of test number 7, in which the relative movement distance between the nozzle and the contact tip is less than 30% of the nozzle tip gap distance, has been evaluated as "Δ" (fair) in spatter drop condition. Also the Example of test number 10, in which the relative movement distance between the nozzle and the contact tip is larger than 90% of the nozzle tip gap distance, has been evaluated as "Δ" (fair) in spatter drop condition.

In the Comparative Examples of test numbers 44 and 45, the nozzle and the contact tip have a structure of being unable to relatively move; therefore, even though at first the state of the arc was stable, spatter drops adhered to the inside of the nozzle and instability was caused, and a state where welding was unable to be continued unless spatter drop removal working was performed was brought about. In the Comparative Example of test number 41, in which the nozzle tip gap distance is less than 2 mm, and the Comparative Example of test number 43, in which the movable distance is 1.5 mm, the flow velocity of shielding gas is too fast; therefore, the gas in the groove (around immediately below the torch) was likely to go out of order and draw in the air, and welding defects such as blowholes occurred.

As hereinabove, in the case where the nozzle tip gap distance is within the range of not less than 2 mm and not more than 7 mm, and the relative movement distance between the nozzle and the contact tip is within the range of not less than 30% and not more than 90% of the nozzle tip gap distance, an effective spatter drop removal effect can be obtained while the stabilization of the arc and the suppression of choking due to spatter drops of the jet port of the nozzle are balanced moderately and fusion bonding between the nozzle and the contact tip is prevented.

<Flow Rate of Shielding Gas>

In all of the Examples of test numbers 1 to 19, the flow rate of shielding gas is within the range of not less than 15 L/min and not more than 50 L/min, and the flow velocity of shielding gas is within the range of not less than 1 m/sec and not more than 10 m/sec.

On the other hand, the Comparative Example of test number 42, in which the flow rate of shielding gas is less than 15 L/min and the flow velocity of shielding gas is less than 1 m/sec, has been evaluated as "x" (poor) in all the points of continuous weldability, spatter drop condition, and welding defects. Also the Comparative Example of test number 41, in which the flow velocity of shielding gas is larger than 10 m/sec, has been evaluated as "x" (poor) in all the points of continuous weldability, spatter drop condition, and welding defects.

As described above, it has been verified that, in the case where, in welding using the welding torch according to one embodiment of present invention, the flow rate of shielding gas jetted from the nozzle is within the range of not less than 15 L/min and not more than 50 L/min and the flow velocity of shielding gas is within the range of not less than 1 m/sec and not more than 10 m/sec, the stabilization of the arc and a reduction in the amount of spatter drops are achieved effectively.

(Test 2)

Next, the results of test 2 in which pulse welding tests were performed using welding torches according to an embodiment of the present invention are described with reference to Table 5-1, Table 5-2, and Table 6. Examples in which welding torches according to an embodiment of the present invention were used are shown in test numbers 20 to 39. Specifications of welding nozzles, and the flow rates and the flow velocities of shielding gases are shown in Table 5-1, and specifications of cables and conditions of pulse welding are shown in Table 5-2. The results of test 2 based on pulse welding are shown in Table 6. The items of Table 5-1 are set to the same in all the Examples of test numbers 20 to 39.

TABLE 5-1

| No. | Inner diameter of nozzle: Dn (mm) | Outer diameter of tip: Dt (mm) | Nozzle tip gap distance: (Dn − Dt)/2 (mm) | Movable distance (mm) | Ratio (%) | Flow rate of gas: (L/min) | Flow velocity of gas: (m/s) |
|---|---|---|---|---|---|---|---|
| 20 | 14 | 6 | 4 | 3 | 75 | 25 | 3.32 |
| 21 | 14 | 6 | 4 | 3 | 75 | 25 | 3.32 |
| 22 | 14 | 6 | 4 | 3 | 75 | 25 | 3.32 |
| 23 | 14 | 6 | 4 | 3 | 75 | 25 | 3.32 |

TABLE 5-1-continued

| No. | Inner diameter of nozzle: Dn (mm) | Outer diameter of tip: Dt (mm) | Nozzle tip gap distance: (Dn − Dt)/2 (mm) | Movable distance (mm) | Movable distance Ratio (%) | Flow rate of gas: (L/min) | Flow velocity of gas: (m/s) |
|---|---|---|---|---|---|---|---|
| 24 | 14 | 6 | 4 | 3 | 75 | 25 | 3.32 |
| 25 | 14 | 6 | 4 | 3 | 75 | 25 | 3.32 |
| 26 | 14 | 6 | 4 | 3 | 75 | 25 | 3.32 |
| 27 | 14 | 6 | 4 | 3 | 75 | 25 | 3.32 |
| 28 | 14 | 6 | 4 | 3 | 75 | 25 | 3.32 |
| 29 | 14 | 6 | 4 | 3 | 75 | 25 | 3.32 |
| 30 | 14 | 6 | 4 | 3 | 75 | 25 | 3.32 |
| 31 | 14 | 6 | 4 | 3 | 75 | 25 | 3.32 |
| 32 | 14 | 6 | 4 | 3 | 75 | 25 | 3.32 |
| 33 | 14 | 6 | 4 | 3 | 75 | 25 | 3.32 |
| 34 | 14 | 6 | 4 | 3 | 75 | 25 | 3.32 |
| 35 | 14 | 6 | 4 | 3 | 75 | 25 | 3.32 |
| 36 | 14 | 6 | 4 | 3 | 75 | 25 | 3.32 |
| 37 | 14 | 6 | 4 | 3 | 75 | 25 | 3.32 |
| 38 | 14 | 6 | 4 | 3 | 75 | 25 | 3.32 |
| 39 | 14 | 6 | 4 | 3 | 75 | 25 | 3.32 |

TABLE 5-2

| No. | Cable length: L (mm) | Cable diameter: Dc (mm) | Cable length/Cross sectional area: L/S (1/mm) | First pulse peak current: Ip1 (A) | Second pulse peak current: Ip2 (A) | First pulse peak span: (Tp1) (msec) | Second pulse peak span: (Tp2) (msec) |
|---|---|---|---|---|---|---|---|
| 20 | 10000 | 17 | 749 | 500 | 400 | 2.5 | 4.0 |
| 21 | 50000 | 17 | 3747 | 500 | 400 | 2.5 | 4.0 |
| 22 | 100000 | 14 | 9099 | 500 | 400 | 2.5 | 4.0 |
| 23 | 100000 | 12 | 10616 | 500 | 400 | 2.5 | 4.0 |
| 24 | 10000 | 17 | 749 | 400 | 450 | 4.0 | 3.5 |
| 25 | 10000 | 17 | 749 | 600 | 400 | 1.5 | 4.0 |
| 26 | 10000 | 17 | 749 | 700 | 400 | 1.0 | 4.0 |
| 27 | 10000 | 17 | 749 | 400 | 350 | 3.0 | 4.5 |
| 28 | 10000 | 17 | 749 | 350 | 300 | 3.5 | 5.5 |
| 29 | 10000 | 17 | 749 | 600 | 500 | 2.0 | 3.5 |
| 30 | 10000 | 17 | 749 | 600 | 550 | 2.0 | 3.5 |
| 31 | 10000 | 17 | 749 | 500 | 300 | 2.5 | 5.5 |
| 32 | 10000 | 17 | 749 | 500 | 250 | 2.5 | 5.5 |
| 33 | 10000 | 17 | 749 | 600 | 500 | 1.0 | 1.5 |
| 34 | 10000 | 17 | 749 | 600 | 500 | 1.0 | 1.0 |
| 35 | 10000 | 17 | 749 | 500 | 300 | 2.5 | 6.0 |
| 36 | 10000 | 17 | 749 | 400 | 300 | 3.5 | 5.0 |
| 37 | 10000 | 17 | 749 | 400 | 300 | 4.0 | 5.0 |
| 38 | 10000 | 17 | 749 | 600 | 400 | 1.0 | 4.0 |
| 39 | 10000 | 17 | 749 | 600 | 400 | 0.3 | 4.0 |

TABLE 6

| No. | Continuous weldability | Spatter drop condition | Welding defects | |
|---|---|---|---|---|
| 20 | ○ | ⊙ | ○ | Example |
| 21 | ○ | ⊙ | ○ | Example |
| 22 | ○ | ⊙ | ○ | Example |
| 23 | ○ | Δ | ○ | Example |
| 24 | ○ | Δ | ○ | Example |
| 25 | ○ | ⊙ | ○ | Example |
| 26 | ○ | ○ | ○ | Example |
| 27 | ○ | ⊙ | ○ | Example |
| 28 | ○ | ○ | ○ | Example |
| 29 | ○ | ⊙ | ○ | Example |
| 30 | ○ | ○ | ○ | Example |
| 31 | ○ | ⊙ | ○ | Example |
| 32 | ○ | ○ | ○ | Example |
| 33 | ○ | ⊙ | ○ | Example |
| 34 | ○ | ○ | ○ | Example |
| 35 | ○ | ○ | ○ | Example |
| 36 | ○ | ⊙ | ○ | Example |
| 37 | ○ | ○ | ○ | Example |
| 38 | ○ | ⊙ | ○ | Example |
| 39 | ○ | ○ | ○ | Example |

In test 2, the detachment of a droplet was detected to control pulse welding. Welding based on a direct current of a constant voltage not using a pulse waveform was performed in the welding of the first layer, and pulse welding was performed in the welding of the second layer and thereafter.

<Pulse Test 1>

Each of the Examples except test number 24 has a pulse waveform in which the first pulse has a higher peak current value than the second pulse and the second pulse has a longer peak span than the first pulse. It has been revealed that, in these Examples, except for the Example of test number 23, an evaluation of "◯" (good) or more has been obtained in continuous weldability and welding defects by welding using a pulse wave. The Example of test number 23 has been evaluated as "Δ" (fair) in spatter drop condition, and a cause thereof will be described in consideration regarding the cable length described later.

On the other hand, the Example of test number 24, in which the first pulse does not have a higher peak current value than the second pulse, has been evaluated as "Δ" (fair) in spatter drop condition, in spite of using a pulse wave.

As hereinabove, it has been verified that, in the case where, when performing pulse welding using a welding torch according to an embodiment of the present invention, the pulse waveform is one in which the first pulse has a higher peak current value than the second pulse and the second pulse has a longer peak span than the first pulse, excellent performance is exhibited in spatter drop condition.

<Pulse Test 2>

Further, in Examples of test numbers 20, 21, 22, 25, 27, 29, 31, 33, 36, and 38, a peak current value of the first pulse is within a range of not less than 400 A and not more than 600 A, a peak current value of the second pulse is within a range of not less than 300 A and not more than 500 A, a peak span of the first pulse is within a range of not less than 0.5 msec and not more than 3.5 msec, and a peak span of the second pulse is within a range of not less than 1.5 msec and not more than 5.5 msec.

It has been revealed that, in these Examples, an evaluation of "⊙" (excellent) has been obtained in spatter drop condition by welding using a pulse wave.

On the other hand, for example, in the Example of test number 28, in which the peak current value of the first pulse is less than 400 A, an evaluation of "⊙" (excellent) has not been obtained in spatter drop condition. In the Example of test number 26, in which the peak current value of the first pulse is larger than 600 A, an evaluation of "⊙" (excellent) has not been obtained in spatter drop condition, either.

In the Example of test number 32, in which the peak current value of the second pulse is less than 300 A, an evaluation of "⊙" (excellent) has not been obtained in spatter drop condition. In the Example of test number 30, in which the peak current value of the second pulse is larger than 500 A, an evaluation of "⊙" (excellent) has not been obtained in spatter drop condition, either.

In the Example of test number 39, in which the peak span of the first pulse is less than 0.5 msec, an evaluation of "⊙" (excellent) has not been obtained in spatter drop condition. In the Examples of test numbers 24 and 37, in which the peak span of the first pulse is larger than 3.5 msec, an evaluation of "⊙" (excellent) has not been obtained in spatter drop condition. In the Example of test number 34, in which the peak span of the second pulse is less than 1.5 msec, an evaluation of "⊙" (excellent) has not been obtained in spatter drop condition. In the Example of test number 35, in which the peak span of the second pulse is larger than 5.5 msec, an evaluation of "⊙" (excellent) has not been obtained in spatter drop condition.

As described above, it has been verified that in a pulse waveform, in case where a peak current value of the first pulse is within a range of not less than 400 A and not more than 600 A, a peak current value of the second pulse is within a range of not less than 300 A and not more than 500 A, a peak span of the first pulse is within a range of not less than 0.5 msec and not more than 3.5 msec, and a peak span of the second pulse is within a range of not less than 1.5 msec and not more than 5.5 msec, the spatter drop condition has extremely excellent properties.

<Cable Length>

The Example of test number 23, in which the rate of the cable length (L mm) of the power cable to the cable cross sectional area (S mm$^2$) (L/S; unit: 1/mm) is larger than 10000, has been evaluated as "Δ" (fair) in spatter drop condition, in spite of performing pulse welding. This is due to the fact that the cable length (L) is too long with respect to the cable cross sectional area (S). As shown in the Example of test number 22, in the case where the value of L/S is less than 10000, the result has been evaluated as "⊙" (excellent) in spatter drop condition.

Thus, it has been verified that, to detect the detachment of a droplet precisely and execute appropriate pulse welding, it is important to have the relationship of L/S≤10000.

As hereinabove, in the welding device according to the above embodiment, the inner diameter of the end of the nozzle 210 is reduced, the nozzle 210 and the contact tip 220 have a relatively movable structure, and the inner diameter of the end of the nozzle is within the range of not less than 10 mm and not more than 20 mm. Hence, the occurrence of spatter drops can be suppressed, and further, even if spatter drops adhere to the nozzle 210, adhering spatter drops can be removed. In particular, in the case where the nozzle tip gap distance in the initial state is within the range of not less than 2 mm and not more than 7 mm, and the relative movement distance M between the nozzle 210 and the contact tip 220 is within the range of not less than 30% and not more than 90% of the nozzle tip gap distance D, an effective spatter drop removal effect can be obtained while fusion bonding between the nozzle 210 and the contact tip 220 is prevented. Furthermore, by employing a welding torch 200 of such a structure, the arc can be stabilized even in continuous welding; thus, the stabilization of the arc and a reduction in the amount of spatter drops can be promoted more by pulse welding using a welding current with a pulse waveform.

Although forms of implementation and aspects of implementation of the present invention have been described, the contents of the disclosure may be changed in particulars of the configuration, and changes to the combination and the order of elements in the forms of implementation and the aspects of implementation, etc. may be made without departing from the scope and the idea of the present invention claimed.

REFERENCE SIGNS LIST

1 output control element
2 transformer
3 rectifying section
4 contact tip
5 wire
6 arc
7 welding object material
8 reactor
9 current detector
10 voltage detector
11 voltage differentiator
12 second order differentiator
13 second order derivative value setter
14 comparator
15 output controller 16 droplet detachment detection section
17 waveform setter
18 waveform generator
50 welding device
100 portable welding robot
110 robot main body
112 main body section
114 fixing arm section
116 movable arm section
120 guide rail
130 torch connection section
132, 134 torch clamp
140 magnet
150 cable clamp
160 grasping handles
170 crank
200 welding torch
210 nozzle
220 contact tip
230 orifice
240 tip body
250 insulating cylinder
250a inside member
260 fixing nut
270 insulating cover
280 O ring
290 compression spring
292 wave washer
294 washer
296 washer
298 hole
300 feeding device
400 welding power source
410 power cable
420 conduit tube
430 conduit cable
500 gas supply source
510 gas tube
600 control device
610, 620 control cable

The invention claimed is:

1. A welding device for gas shielded arc welding, the welding device comprising:
a portable welding robot mounted with a welding torch including a nozzle that guides jetting of shielding gas and a contact tip that performs energization on a consumable electrode;
a feeding device that supplies the consumable electrode to the welding torch;
a welding power source that supplies electric power to the consumable electrode via the contact tip;
a gas supply source that supplies the shielding gas to be jetted from an end of the nozzle; and
a control device that controls the portable welding robot, wherein,
when the welding torch is seen from a side of jetting of the shielding gas,
the contact tip is placed in an inside of an opening of the nozzle,
the nozzle and the contact tip have a relatively movable structure, and
an inner diameter of the end of the nozzle is within a range of not less than 10 mm and not more than 20 min,
wherein a welding current supplied from the welding power source has a pulse waveform in which a combination of a first pulse and a second pulse is set as one period, the first pulse has a higher peak current value than the second pulse, and the second pulse has a longer peak span than the first pulse,
wherein a peak current value of the first pulse is within a range of not less than 400 A and not more than 600 A, a peak current value of the second pulse is within a range of not less than 300 A and not more than 500 A, a peak span of the first pulse is within a range of not less than 0.5 msec and not more than 3.5 msec, and a peak span of the second pulse is within a range of not less than 1.5 msec and not more than 5.5 msec,
wherein the welding power source includes
a voltage detector that detects a welding arc voltage,
a current detector that detects a welding current, and
a droplet detachment detection section that detects detachment of a droplet formed at an end of the consumable electrode,
wherein the droplet detachment detection section, when it has detected the detachment of the droplet on a basis of at least one of the welding current, the arc voltage, and a ratio between an arc voltage and a welding current (WI; resistance) obtained from the voltage detector and the current detector in a peak span of the first pulse, causes a peak current value of the first pulse to be reduced, and
wherein, when a cable length of a power cable that connects the welding power source and the portable welding robot together is denoted by L mm and a cable cross sectional area is by S mm², a rate of L to S (L/S; unit: 1/mm) has a relationship of L/S≤10000.

2. A gas shielded arc welding method using a welding device, wherein
the welding device is a device including
a portable welding robot mounted with a welding torch including a nozzle that guides jetting of shielding gas and a contact tip that performs energization on a consumable electrode,
a feeding device that supplies the consumable electrode to the welding torch,
a welding power source that supplies electric power to the consumable electrode via the contact tip,
a gas supply source that supplies the shielding gas to be jetted from an end of the nozzle, and
a control device that controls the portable welding robot, in which, when the welding torch is seen from a side of jetting of the shielding gas,
the contact tip is placed in an inside of an opening of the nozzle,
the nozzle and the contact tip have a relatively movable structure, and
an inner diameter of the end of the nozzle is within a range of not less than 10 mm and not more than 20 mm,
a flow rate of the shielding gas is within a range of not less than 15 L/min and not more than 50 L/min, and
a flow velocity of the shielding gas is within a range of not less than 1 m/sec and not more than 10 m/sec,
wherein a welding current supplied from the welding power source has a pulse waveform in which a combination of a first pulse and a second pulse is set as one period, the first pulse has a higher peak current value than the second pulse, and the second pulse has a longer peak span than the first pulse,
wherein a peak current value of the first pulse is within a range of not less than 400 A and not more than 600 A, a peak current value of the second pulse is within a range of not less than 300 A and not more than 500 A, a peak span of the first pulse is within a range of not less than 0.5 msec and not more than 3.5 msec, and a peak span of the second pulse is within a range of not less than 1.5 msec and not more than 5.5 msec, wherein the welding power source includes
a voltage detector that detects a welding arc voltage,
a current detector that detects a welding current, and
a droplet detachment detection section that detects detachment of a droplet formed at an end of the consumable electrode, wherein the droplet detachment detection section, when it has detected the detachment of the droplet on a basis of at least one of the welding current, the arc voltage, and a ratio between an arc voltage and a welding current (V/I:resistance) obtained from the voltage detector and the current detector in a peak span of the first pulse, causes a peak current value of the first pulse to be reduced, and wherein, when a cable length of a power cable that connects the welding power source and the portable welding robot together is denoted by L mm and a cable cross sectional area is by S mm$^2$, a rate of L to S (L/S; unit: 1/mm) has a relationship of L/S≤10000.

3. A multilayer welding method that is a gas shielded arc welding method for multilayer welding using a welding device, wherein the welding device is a device including
a portable welding robot mounted with a welding torch including a nozzle that guides jetting of shielding gas and a contact tip that performs energization on a consumable electrode,
a feeding device that supplies the consumable electrode to the welding torch,
a welding power source that supplies electric power to the consumable electrode via the contact tip,
a gas supply source that supplies the shielding gas to be jetted from an end of the nozzle, and
a control device that controls the portable welding robot, in which, when the welding torch is seen from a side of jetting of the shielding gas, the contact tip is placed in an inside of an opening of the nozzle,
the nozzle and the contact tip have a relatively movable structure, and
an inner diameter of the end of the nozzle is within a range of not less than 10 mm and not more than 20 mm,
a flow rate of the shielding gas is within a range of not less than 15 L/min and not more than 50 L/min,
a flow velocity of the shielding gas is within a range of not less than 1 m/sec and not more than 10 m/sec, wherein a welding current supplied from the welding power source has a pulse waveform in which a combination of a first pulse and a second pulse is set as one period, the first pulse has a higher peak current value than the second pulse, and the second pulse has a longer peak span than the first pulse, wherein a peak current value of the first pulse is within a range of not less than 400 A and not more than 600 A, a peak current value of the second pulse is within a range of not less than 300 A and not more than 500 A, a peak span of the first pulse is within a range of not less than 0.5 msec and not more than 3.5 msec, and a peak span of the second pulse is within a range of not less than 1.5 msec and not more than 5.5 msec, wherein the welding power source includes
a voltage detector that detects a welding arc voltage,
a current detector that detects a welding current, and
a droplet detachment detection section that detects detachment of a droplet formed at an end of the consumable electrode, wherein the droplet detachment detection section, when it has detected the detachment of the droplet on a basis of at least one of the welding current, the arc voltage, and a ratio between an arc voltage and a welding current (V/I:resistance) obtained from the voltage detector and the current detector in a peak span of the first pulse, causes a peak current value of the first pulse to be reduced, wherein, when a cable length of a power cable that connects the welding power source and the portable welding robot together is denoted by L mm and a cable cross sectional area is by S mm$^2$, a rate of L to S (L/S; unit: 1/mm) has a relationship of L/S≤10000, and in a case of the multilayer welding,
(1) only a first layer,
(2) the first layer to a second layer, or
(3) the first layer to a third layer are welded using, as a welding current supplied from the welding power source, a direct current of a constant voltage not using a pulse waveform, and remaining layers are welded using, as the welding current, a welding current having a pulse waveform in which a combination of a first pulse and a second pulse is set as one period, the first pulse has a higher peak current value than the second pulse, and the second pulse has a longer peak span than the first pulse.

* * * * *